(12) United States Patent
Shibata et al.

(10) Patent No.: US 7,124,563 B2
(45) Date of Patent: Oct. 24, 2006

(54) GRASS COLLECTING SYSTEM FOR A LAWN MOWER

(75) Inventors: Takashi Shibata, Sakai (JP); Hideya Umemoto, Sakai (JP); Nobuyuki Yamashita, Izumi (JP); Eriya Harada, Sakai (JP); Takashi Kuramoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/936,432

(22) Filed: Sep. 8, 2004

(65) Prior Publication Data

US 2005/0109003 A1    May 26, 2005

(30) Foreign Application Priority Data

Nov. 21, 2003    (JP)    ............................. 2003-392598

(51) Int. Cl.
*A01D 43/00*    (2006.01)
(52) U.S. Cl. .............................. 56/203; 56/200; 56/202
(58) Field of Classification Search .................. 56/194, 56/199, 200, 202, 203, 205, 206
See application file for complete search history.

(56) References Cited

U.S. PATENT DOCUMENTS 2,067,916 A * 1/1937 Haffner et al. ................. 56/199
3,893,284 A * 7/1975 Thon et al. .................... 56/202
4,203,276 A * 5/1980 Plamper ........................ 56/202
4,637,203 A * 1/1987 Fedeli .......................... 56/202
6,050,072 A * 4/2000 Chabrier et al. .............. 56/202
6,484,486 B1 * 11/2002 Nagai et al. .................. 56/16.8
6,513,312 B1   2/2003 Ishimori et al.

FOREIGN PATENT DOCUMENTS

JP    03-004714    1/1991
JP    2001-275438    10/2001

* cited by examiner

*Primary Examiner*—Thomas B. Will
*Assistant Examiner*—Alicia Torres
(74) *Attorney, Agent, or Firm*—The Webb Law Firm

(57) ABSTRACT

A grass collecting system having a grass collecting duct for transmitting grass clippings reaped by a mower to a swingable grass catcher. The grass collecting duct includes top and side plates for guiding grass clippings from the mower unit to the grass catcher. An outlet portion is defined by an end of a space surrounded by the top and side plates. The grass collection system also having a grass clippings discharge path for transmitting grass clippings received from the mower, from the outlet portion into the grass catcher, and a bottom plate unit disposed in the outlet portion that is swingable about a pivot shaft from a guide position to an upstanding position. The bottom plate unit has a shortening mechanism for shortening a distance between a forward end of the bottom plate unit projecting into the grass collecting duct and the pivot shaft.

18 Claims, 13 Drawing Sheets

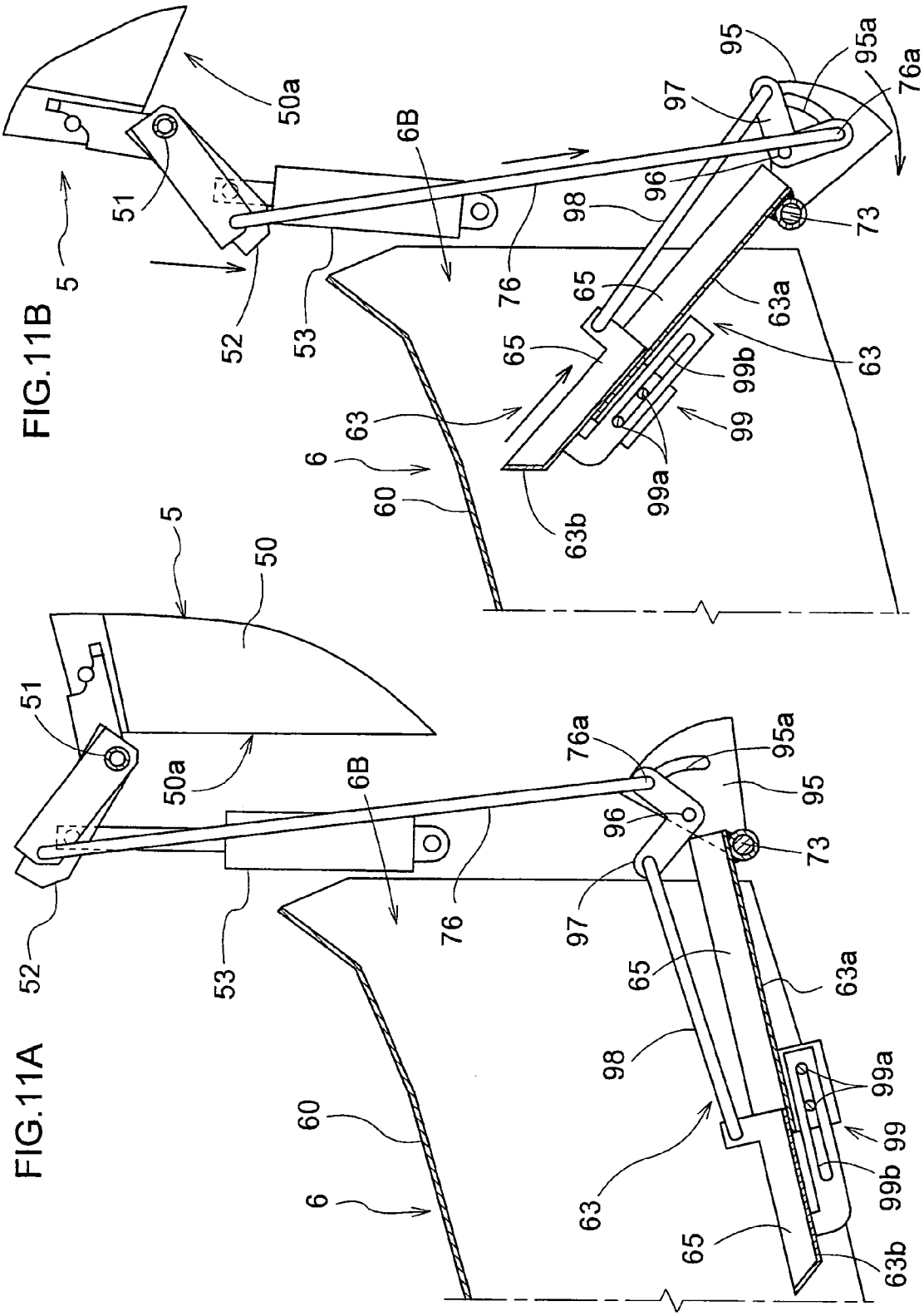

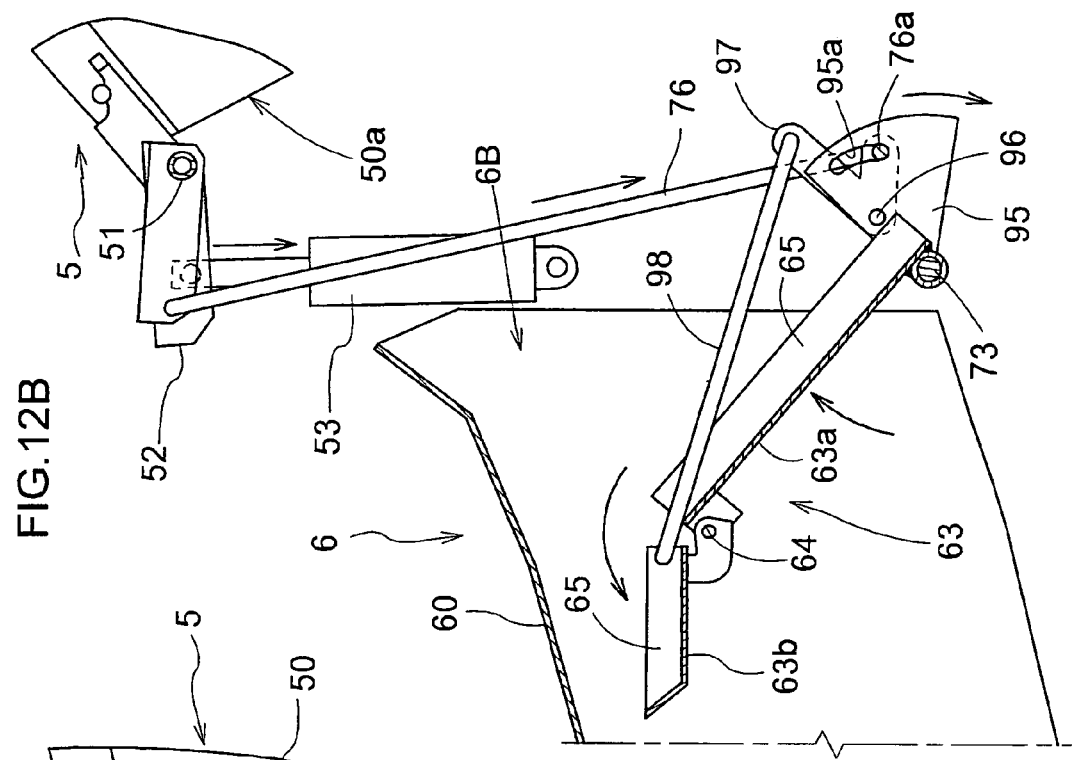
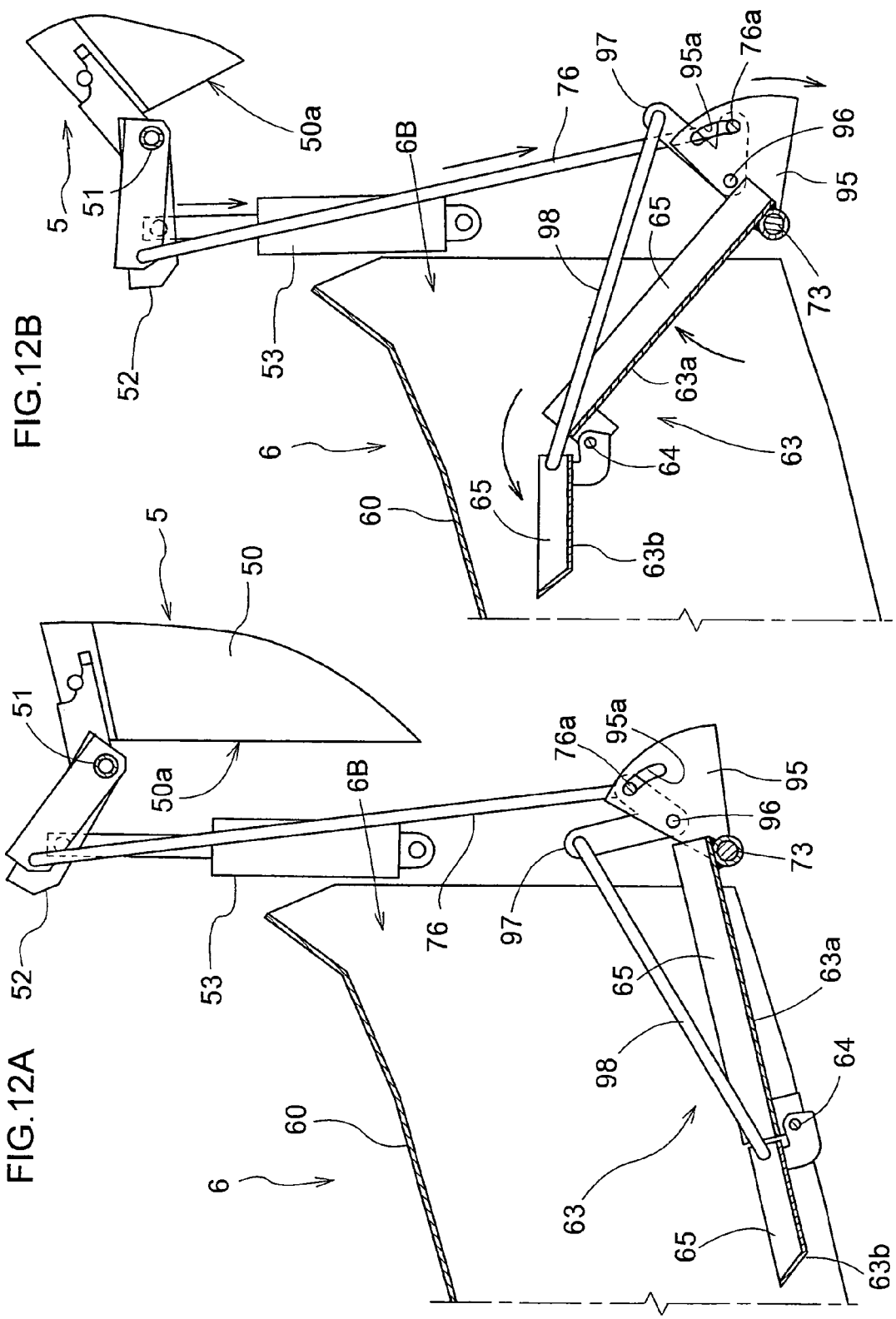

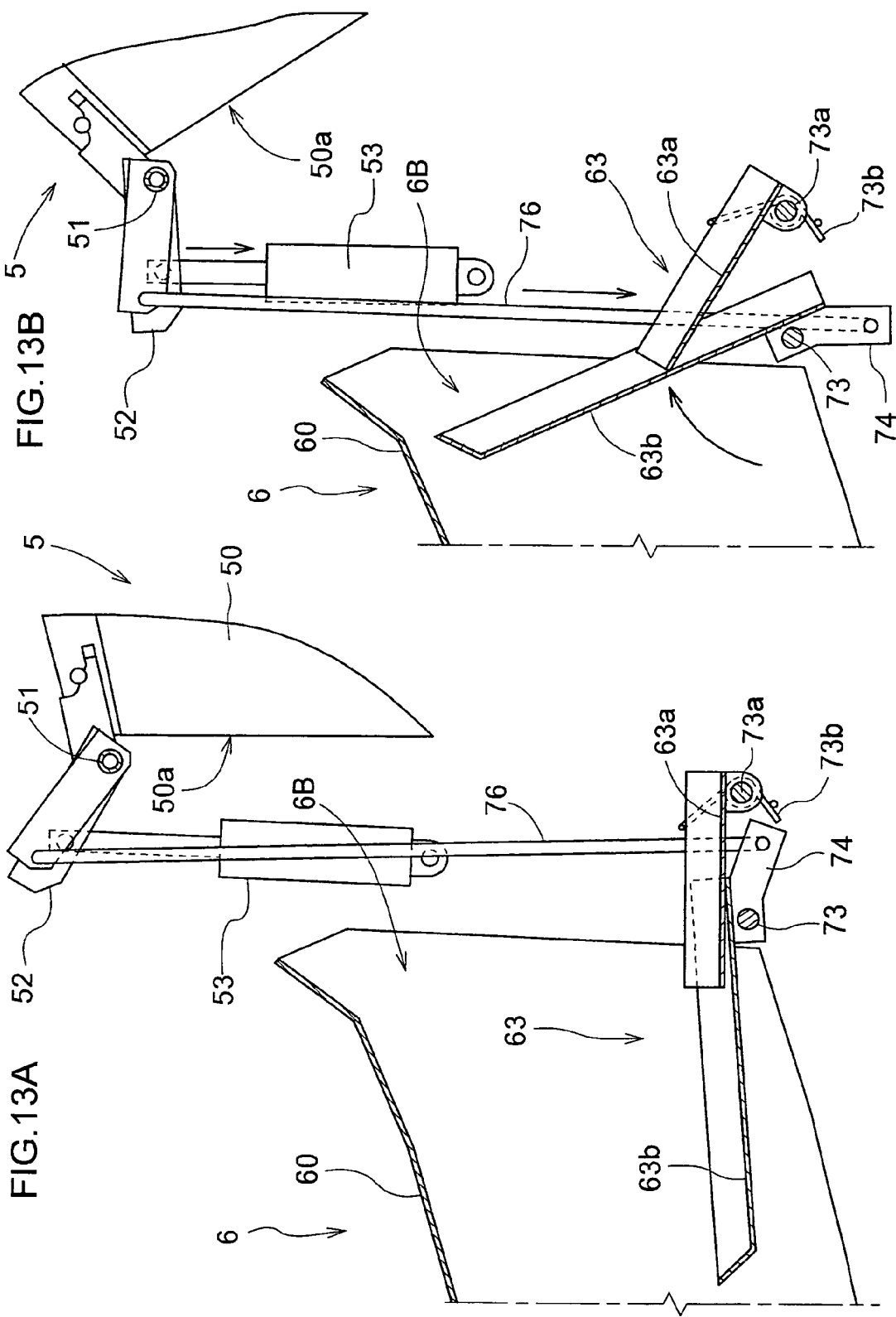

GRASS COLLECTING SYSTEM FOR A LAWN MOWER

BACKGROUND OF THE INVENTION

1. Field of the Invention

This invention relates to a grass collecting system for a lawn mower having a grass collecting duct for transmitting grass clippings reaped by a mower unit to a grass catcher, the grass catcher being supported by a lift mechanism to be vertically movable relative to the mower unit.

2. Description of the Related Art

In an environment where grass clippings reaped by the mower unit cannot be discharged directly, it is necessary to store the grass clippings temporarily in the grass catcher through the grass collecting duct. The lawn mower having such a grass collecting system, when a certain amount of grass clippings accumulates in the grass catcher, runs to a predetermined grass clippings dump area, and discharges the grass clippings from the grass catcher. In time of discharge, the grass clippings could fall off from the opening of the grass catcher and scatter outside grass clippings dump area before the grass catcher reaches a predetermined position. Various contrivances have heretofore been proposed with a view to avoiding such inconveniences.

For example, a grass collecting apparatus has a lid for closing an opening of a grass catcher, and a guide switchable by the lid. In time of grass cutting operation, the lid is closed, and grass clippings from a duct are collected in the grass catcher through the guide in a guiding position. In time of grass clippings discharge, the grass catcher is detached from the grass collecting duct of the lawn mower, and carried to a grass clippings dump area. Then, the lid is swung open, and the guide also is swung to an open position, to expose the large opening through which the grass clippings are discharged from the grass catcher (see Japanese Unexamined Patent Publication H03-004714, pages 2–3 and FIG. 1, for example).

Instead of a grass catcher being carried by personnel to a grass clippings dump area, a lawn mower may move to the grass clippings dump area and discharge grass clippings from a grass catcher. This lawn mower includes a main container body connected to a lift link mechanism to be swingable about a transverse support axis to switch between a grass collecting position and a grass discharge position. The main container body has an open/close lid swingable about a transverse support axis for opening and closing an opening formed in the rear end of the main container body. A hydraulic cylinder extends between the lift link mechanism and the main container body for position switching of the main container body. A link mechanism is interposed between the lift link mechanism and open/close lid for switching the open/close lid as interlocked to position switching of the main container body. Grass clippings are discharged from the grass catcher by switching the grass catcher from the grass collecting position to the grass discharge position at a high level spaced from the grass collecting duct (see Japanese Unexamined Patent Publication 2001-275438, paragraphs 12–17, FIG. 5, for example). With this lawn mower, backlash or the like could occur in the link mechanism for switching the open/close lid as interlocked to position switching of the main container body, whereby the grass clippings leak from between the main container body and the open/close lid while the lawn mower is running.

A further known example of lawn mowers includes a movable flap disposed in a region between a grass collecting duct and a grass catcher. When the grass catcher moves up away from the grass collecting duct, the movable flap is displaced to a position for closing an opening of the grass catcher, thereby to prevent grass clippings from inadvertently falling from the opening of the grass catcher (see U.S. Pat. No. 6,050,072, Col. 4–6, and FIG. 3, for example). With this lawn mower also, unless the displacement mechanism of the movable flap is manufactured accurately, grass clippings could leak from between the closed movable flap and opening of the grass catcher.

SUMMARY OF THE INVENTION

The object of this invention is to provide a grass collecting system for transmitting grass clippings reaped by a mower unit, through a grass collecting duct into a grass catcher, which system prevents grass clippings leaking from between the grass collecting duct and the grass catcher from scattering to locations other than a grass clippings dump area.

The above object is fulfilled, according to this invention, by a grass collecting system having a grass collecting duct for transmitting grass clippings reaped by a mower unit to a grass catcher in a grass collecting position, the grass catcher being swingable to a grass discharge position, wherein the grass collecting duct includes a top plate and right and left side plates for guiding the grass clippings from the mower unit to the grass catcher, an outlet portion being defined by an end of a space surrounded by the top plate and the right and left side plates. Further, in the construction according to this invention, a grass clippings discharge path is formed for transmitting the grass clippings received from the mower unit, from the outlet portion of the grass collecting duct into the grass catcher, a bottom plate unit is formed in the outlet portion to be swingable about a pivot shaft from a guide position for preventing falling of the grass clippings to an upstanding position, and the bottom plate unit has a shortening mechanism for shortening a distance between a forward end of the bottom plate unit projecting into the grass collecting duct, and the pivot shaft.

With this construction, when the grass catcher swings to the grass discharge position, the projecting forward end of the bottom plate unit is displaced in a direction to reduce the amount of projection. Consequently, the projecting forward end of the bottom plate unit does not contact the top plate of the grass collecting duct. That is, with this bottom plate unit, even if grass clippings collected in the grass catcher fall from a passage opening of the gate frame in time of ascent of the gate frame, the bottom plate unit catches these grass clippings and prevents the grass clippings falling to the ground. When the grass catcher swings to the grass discharge position, the shortening mechanism displaces the projecting forward end of the bottom plate unit in the direction to reduce the amount of projection. This effectively avoids the inconvenience of the forward end contacting the top plate of the grass collecting duct.

The gate frame may be disposed between the outlet portion of the grass collecting duct and the grass catcher for pivotably supporting the grass catcher, and a lift mechanism may be provided for supporting the gate frame and the grass catcher to be vertically movable relative to the outlet portion of the grass collecting duct. Then, when the gate frame is raised by the lift mechanism, the shortening mechanism may displace the projecting forward end of the bottom plate unit in the direction to reduce the amount of projection.

Specifically, the lift mechanism is in the form of a lift link mechanism for vertically moving the gate frame by swinging the gate frame with a driving force of a lift actuator. The bottom plate unit includes a main body supported by the gate frame, and a movable part supported to be pivotable about a transverse axis relative to the main body. The shortening mechanism includes a cam swingable with a swing of the lift link mechanism, a swing piece set to a swing position by contact with the cam object, and a linkage member for interlocking the swing piece and the movable part, the cam causing the swing piece to swing with a change in position of the lift link, and causes the movable part through the linkage member to swing in a predetermined direction when the gate frame is raised from a grass collecting level.

In a preferred embodiment of the invention, an interlocking mechanism is provided for swinging the bottom plate unit to the upstanding position as interlocked to switching of the grass catcher from the grass collecting position to the grass discharge position, the shortening mechanism being operable in response to the swing to the upstanding position of the bottom plate unit by the interlocking mechanism.

Preferably, the interlocking mechanism includes a linkage member for transmitting, to the bottom plate unit, a force of the swing of the grass catcher from the grass collecting position to the grass discharge position, thereby to swing the bottom plate unit from the guide position to the upstanding position. The bottom plate unit, preferably, includes a main body supported to be pivotable about a transverse proximal end axis relative to the gate frame, and a movable part supported to be pivotable about a transverse distal end axis at a forward end of the main body, and the shortening mechanism permits a forward end of the movable part to swing downward by gravity in response to the swing of the bottom plate unit to the upstanding position. With this construction, when swinging the grass catcher from the grass collecting position to the grass discharge position, the force of this swing is used by the interlocking mechanism to swing the bottom plate unit to the upstanding position. When the bottom plate unit is swung to the upstanding position in this way, the control arm forming the shortening mechanism retracts the movable part supported to be extendible and retractable at the forward end of the main body of the bottom plate unit. Thus, without providing a special actuator or the like for actuating the bottom plate unit and movable part, the forward end of the bottom plate unit is retracted while swinging the movable part to the upstanding position. This is effective to eliminate the inconvenience of the forward end of the bottom plate unit contacting the top plate of the grass collecting duct.

Preferably, the shortening mechanism is operable to start displacing the movable part to be out of contact before the swing of the bottom plate unit to the upstanding position. With this construction, the bottom plate unit is swung to the upstanding position after the movable part is moved in the direction to avoid contact. This reliably avoids contact between the movable part and the top plate.

Other features and advantages of this invention will be apparent from the following description of the embodiments to be taken with reference to the drawings.

BRIEF DESCRIPTION OF THE DRAWINGS

FIG. 11A is a side view of a grass catcher before being set to a grass discharge position in a third embodiment;

FIG. 11B is a side view of the grass catcher set to the grass discharge position in the third embodiment;

FIG. 12A is a side view of a grass catcher before being set to a grass discharge position in a fourth embodiment;

FIG. 12B is a side view of the grass catcher set to the grass discharge position in the fourth embodiment;

FIG. 13A is a schematic view showing a bottom plate unit before being folded in a further embodiment; and FIG. 13B is a schematic view showing the bottom plate unit before being folded in the further embodiment

DESCRIPTION OF THE PREFERRED EMBODIMENTS

First Embodiment

Figure 1:
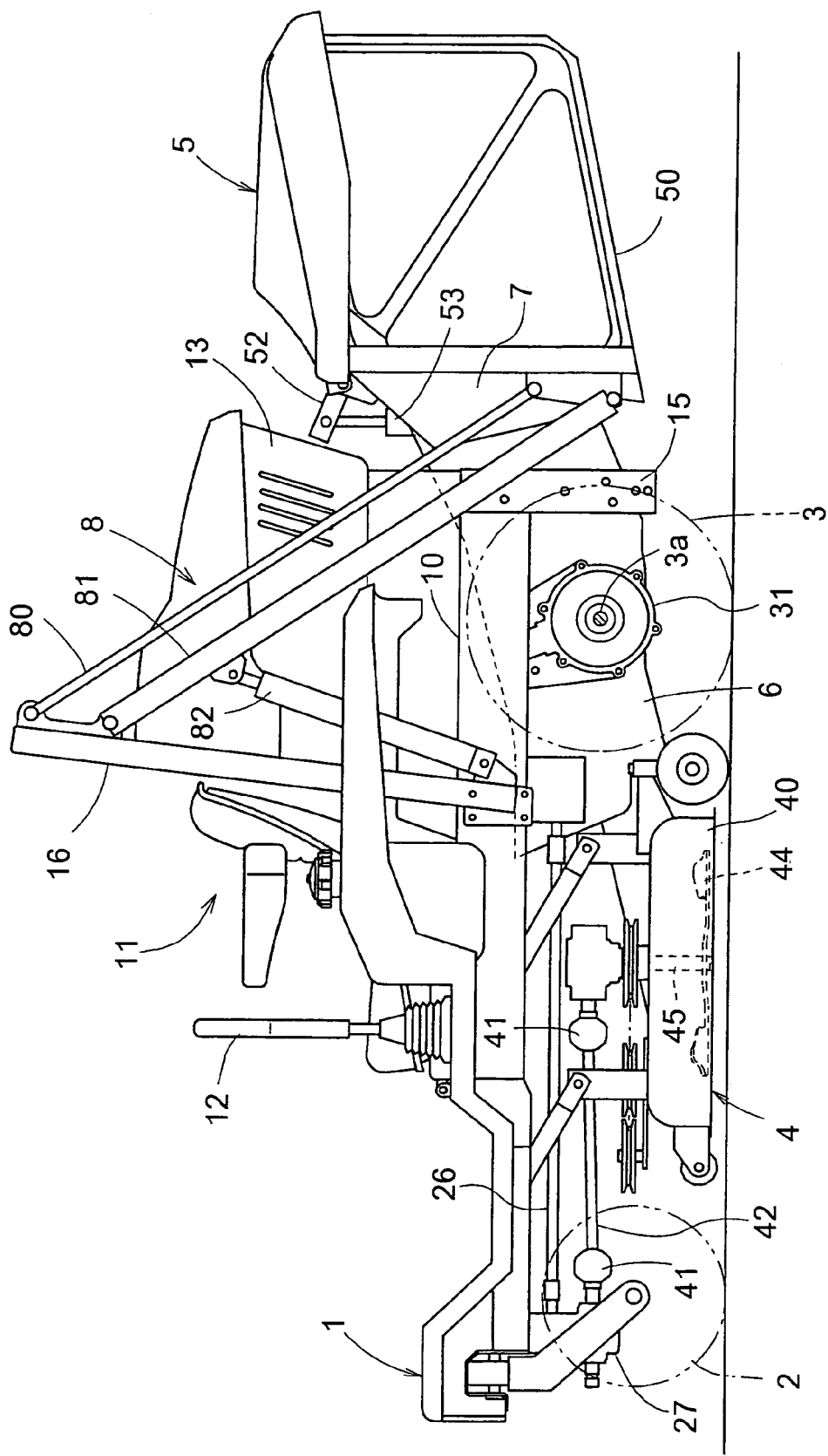
FIG. 1 is a side elevation of a lawn mower in a first embodiment.

FIG. 1 shows a side elevation of a lawn mower. This lawn mower is the mid-mount mower type, and has a vehicle body 1 including frames extending longitudinally, a pair of right and left caster type rollers 2 arranged in a front portion of the vehicle body 1 to act as front wheels, a pair of right and left drive wheel 3 arranged in a rear portion of the vehicle body 1 to act as rear wheels, a mower unit 4 vertically movably attached to the vehicle body 1 between the front wheels 2 and rear wheels 3, and a grass catcher 5 disposed rearwardly of the vehicle body 1. A body frame 10 acting as a core element of the vehicle body 1 basically is formed of a pair of right and left belt-like profile members extending longitudinally.

Grass clippings produced in the mower unit 4 are guided by a grass collecting duct 6 extending through a space between the right and left rear wheels 3 (drive wheel 3), to be collected in the grass catcher 5. The grass collecting duct 6 is connected to the grass catcher 5 through a gate frame 7.

The vehicle body 1 includes a driver's seat 11 located above the mower unit 4, and shift levers 12 arranged at right and left sides of the driver's seat 11. An engine 13 is mounted rearwardly of the driver's seat 11, above the vehicle body 1, and in a transversely middle position.

As seen from FIGS. 2 through 4, power is transmitted from the engine 13, through a ball joint 14 which accommodates a misalignment of transmission shafts resulting from vibration, to an input shaft 21 of a transmission case 20 disposed forwardly of and below the engine 13. In the transmission case 20, the power is transmitted from the input shaft 21 through three spur gears 22 to a power distribution mechanism 23. Propelling power from the power distribution mechanism 23 is distributed through a pair of bevel gears 24a and a transverse relay shaft 24 to right and left HSTs (hydrostatic stepless transmissions) 30. The power having undergone a change speed operation by each of the right and left HSTs 30 is transmitted, through a right or left reduction mechanism 32 mounted in a right or left axle case 31, to an axle 3a of the corresponding one of right the left drive wheels 3. That is, a pair of right and left change speed devices for transmitting power to the right and left drive wheels 3 are each formed of the stepless transmission 30 and reduction mechanism 31.

The power from the engine 13 is transmitted independently through the right and left HSTs 30 to the axles 3a of the right and left drive wheels (rear wheels) 3. The right and left shift levers 12 linked to the corresponding right and left HSTs 30 are operable to shift the right and left HSTs 30 independently of each other. Thus, the running state may be switched between a straight running state in which the right and left HSTs 30 are controlled to the same speed to drive the right and left drive wheels 3 at equal speed, and a turning state in which the right and left HSTs 30 are controlled to different speeds to drive the right and left drive wheels 3 at different speeds.

The HSTs 30 are constructed switchable between forward drive and backward drive. Thus, the turning state includes a gentle turning state in which the right and left drive wheels 3 are driven in the same direction, a pivot turning state in which one of right and left drive wheels 3 is stopped, and a spin turning state in which the right and left drive wheels 3 are driven to in opposite directions.

Figure 4:
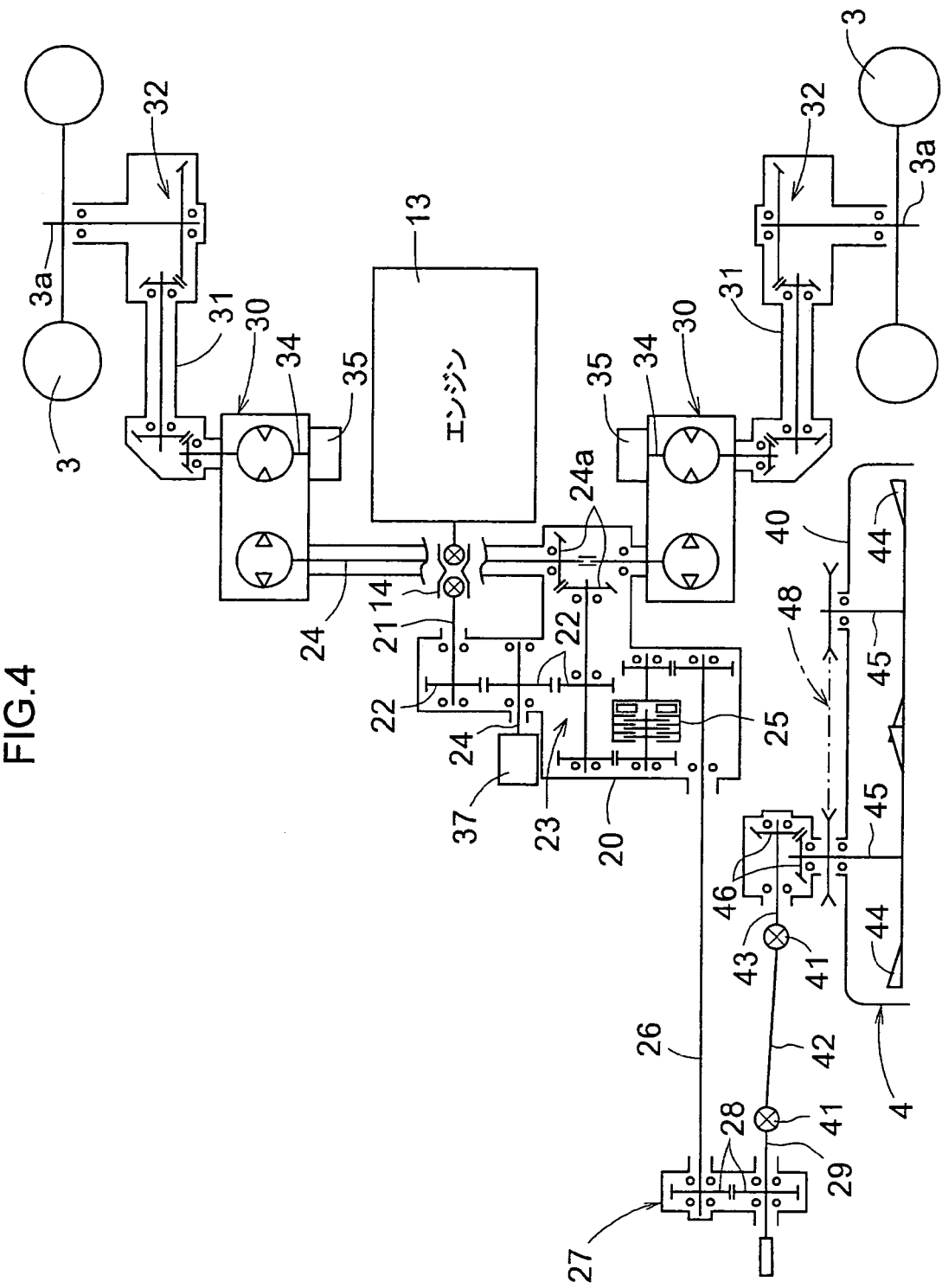
FIG. 4 is a schematic view showing a transmission system of the lawn mower in the first embodiment.

As shown in FIG. 4, the power distribution mechanism 23 includes an operation clutch 25 of the multi-disk type for connecting and disconnecting power for grass cutting operations. The power for operation transmitted through the operation clutch 25 is transmitted to a power takeoff shaft 29 through a first transmission shaft 26 extending fore and aft and a pair of spur gears 28 mounted in a front case 27 in the front portion of the vehicle body. The power is transmitted from the rear end of the power takeoff shaft 29, through a pair of ball joints 41 and a second transmission shaft 42 extending fore and aft, to an input shaft 43 of the mower unit 4.

Power may be taken also from the front end of the power takeoff shaft 29. By using the front end of the power takeoff shaft 29, power may easily be transmitted to an auxiliary working implement, not shown, attached to the front of the vehicle body 1, for example.

The mower unit 4 includes a pair of right and left blades 44 arranged in a housing 40 to be rotatable about vertical support shafts 45.

The power for operation transmitted to the input shaft 43 is transmitted to one of the support shafts 45 through a pair of bevel gears 46. The power is transmitted from the one support shaft 45 to the other support shaft 45 through a belt type transmission mechanism 48. The right and left blades 44 are thereby rotated at equal speed in opposite directions, with loci of rotation partly overlapping and the rotations being directed rearward in the overlapping portions. The blades 44 in rotation, while reaping grass, generate carrier air currents to discharge grass clippings toward the grass collecting duct 6 through a discharge port formed in a transversely middle position at a rear portion of the housing 40.

Figure 3:
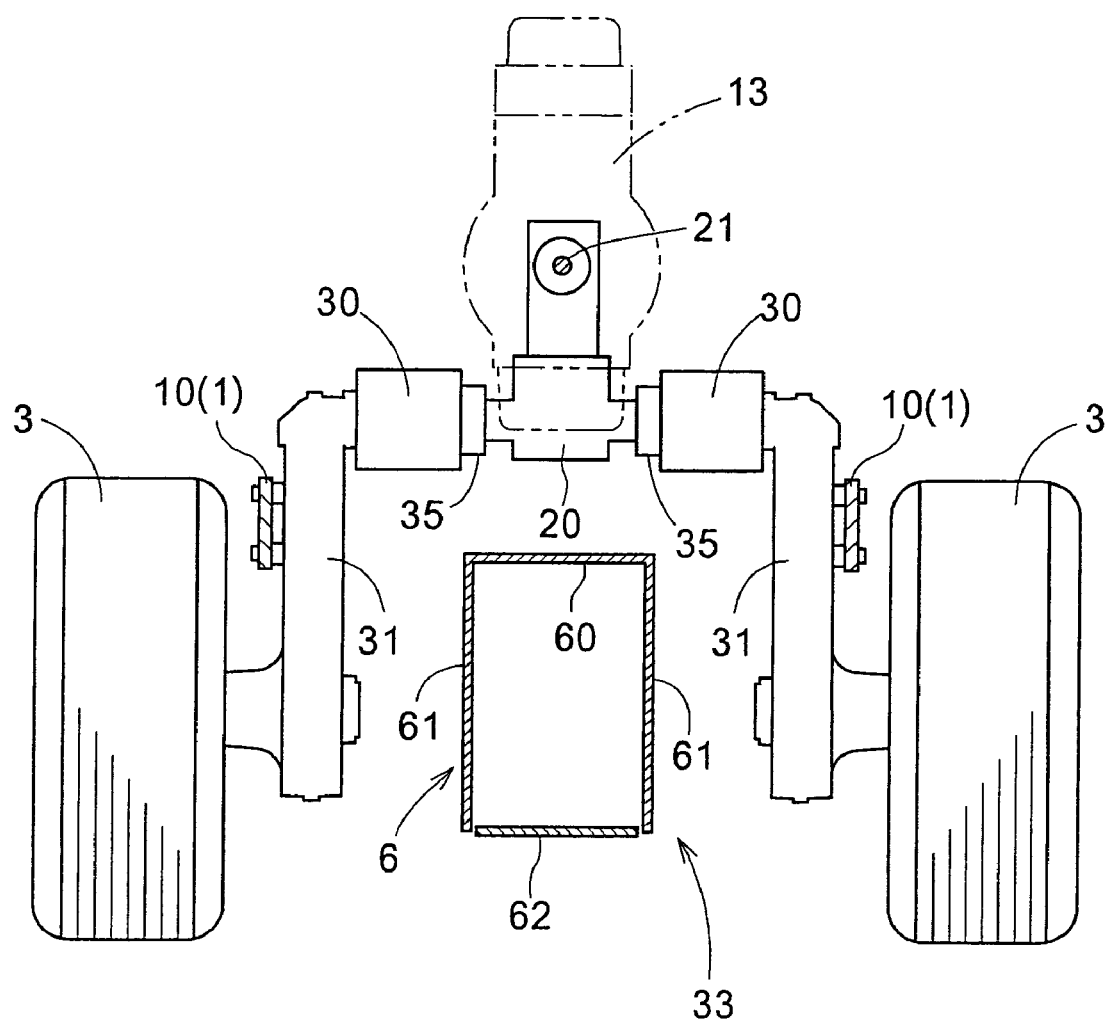
FIG. 3 is a rear view showing a positional relationship between rear wheels and a grass collecting duct in the first embodiment.

As seen from FIGS. 3 and 4, the right and left HSTs 30 and right and left reduction mechanisms 32 are distributed to right and left symmetrical positions about the power distribution mechanism 23 disposed in a transversely middle position of the body frame 10. With this arrangement, the power distribution mechanism 23 and right and left HSTs 30 and reduction mechanisms 31 form a gate shape to produce a space 33 in a lower, transversely middle area. The right and left reduction mechanisms 31 are arranged at and connected to laterally outward sides of the corresponding HSTs 30. Consequently, the space 33 is located between the ground and the body frame 10. The grass collecting duct 6 extends through a transversely middle position in the space 33. The grass collecting duct 6 extends so that the axles 3a of the rear wheels 3 and the center of a duct section are substantially in alignment. It may be confirmed from FIG. 3 that the power distribution mechanism 23 and HSTs 30 are arranged at the same height between the upper ends of the right and left reduction mechanisms 31.

Figure 2:
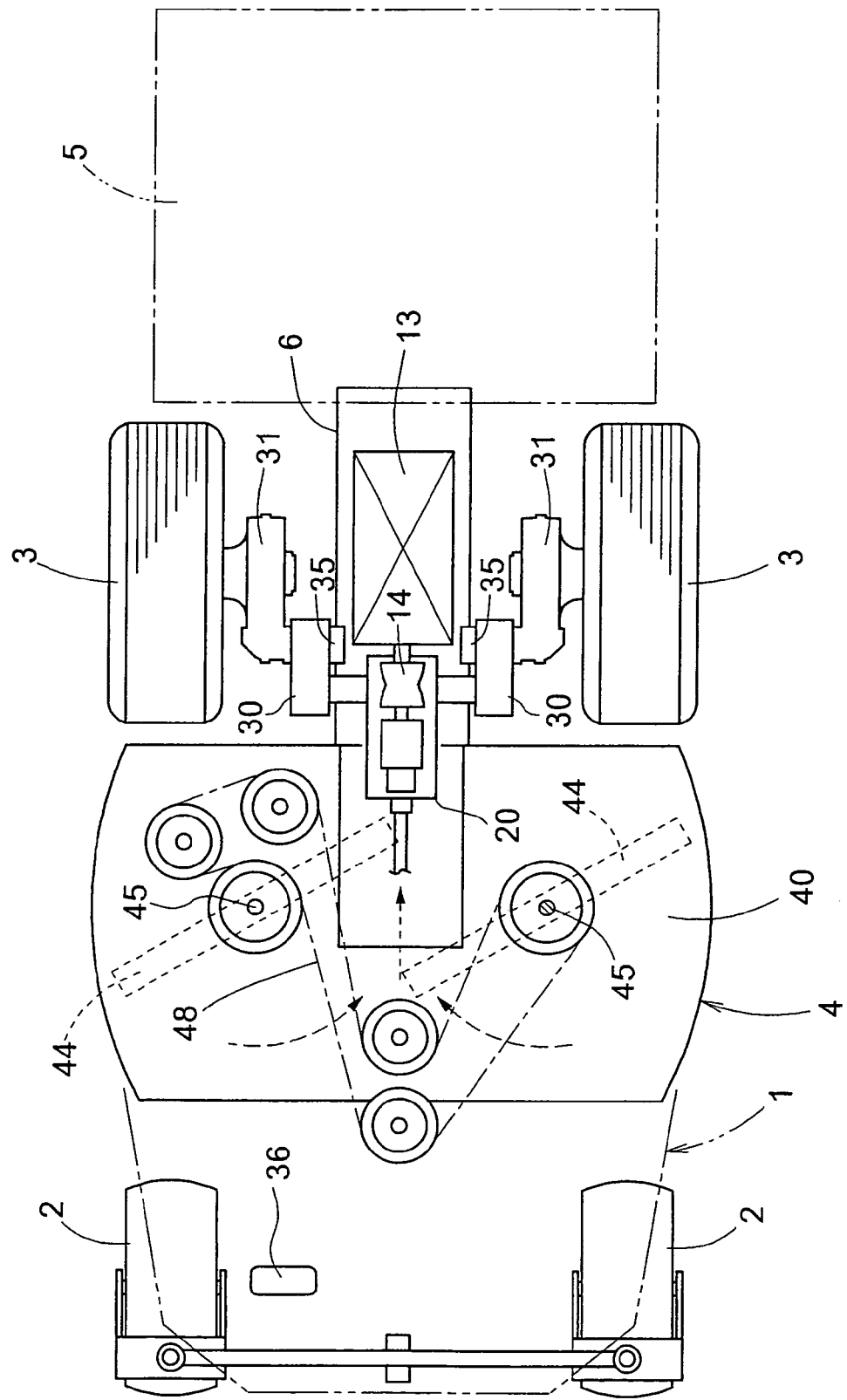
FIG. 2 is a plan view of the lawn mower in the first embodiment.

As shown in FIGS. 2 through 4, wet type brakes 35 are arranged at inward sides of the right and left HSTs 30 for acting on output shafts 34 of the corresponding HSTs 30 to brake the corresponding drive wheels 3. These right and left wet type brakes 35 are operatively connected to a single brake pedal 36 disposed in a right forward position on the body frame 10.

Numeral 37 in FIG. 4 denotes a gear pump driven by rotation of an intermediate shaft rotatable with the middle one of the three spur gears 22 ranging from the input shaft 21 to the power distribution mechanism 23 in the transmission case 20.

Figure 5:
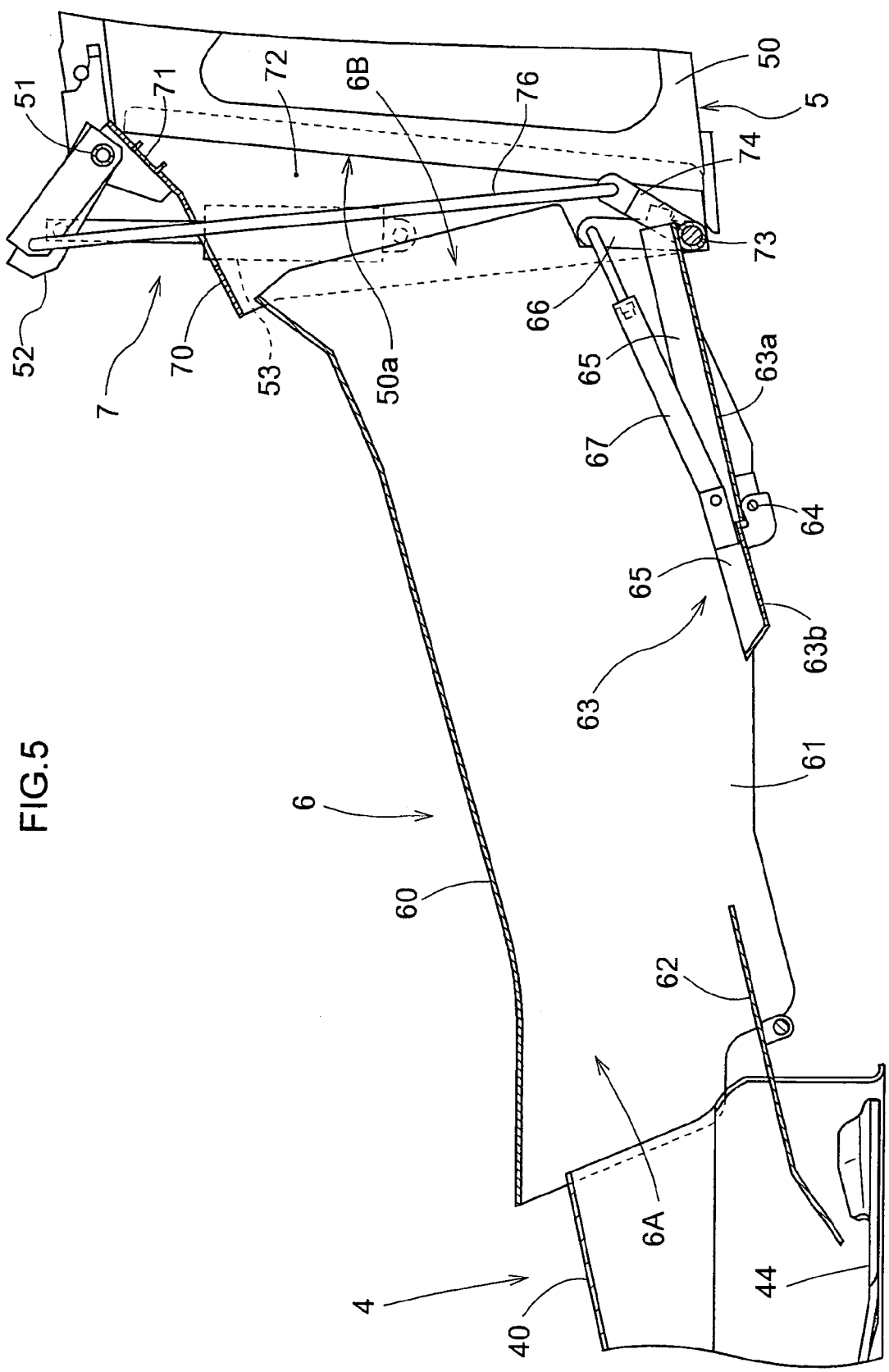
FIG. 5 is a side view in vertical section showing a structure of the grass collecting duct in the first embodiment.

As shown in FIGS. 3 and 5, the grass collecting duct 6 basically is a square duct having a top plate 60 and right and left side plates 61 depending part from side edges of the top plate 60, and opening downward, thus defining a channel section. The duct 6 further includes a short forward bottom plate 62 disposed so as to close the channel opening in an inlet portion 6A connected to the discharge port of the mower unit 4. Grass clippings guided along the grass collecting duct 6 are entrained by the carrier air currents produced by the blade 44 to have upward momentum. Thus, the grass clippings would be transported rearward without falling even if no bottom plate were provided. However, the carrier air currents could whirl around in the inlet portion 6A. The forward bottom plate 62 is provided in order to prevent the grass clippings from falling to the ground when the carrier air currents whirl around. Thus, in order to remove the grass clippings deposited on the surface of the forward bottom plate 62 as the case may be, the forward bottom plate 62 is manually pivotable to a position in which the surface thereof is largely inclined relative to the ground. As described in detail hereinafter, a bottom plate unit 63 is disposed also in an outlet portion 6B of the grass collecting duct 6 connected to the gate frame 7 acting as a connection relay member between the grass collecting duct 6 and the grass catcher 5. As shown in FIG. 1, the grass collecting duct 6 is fixed by the body frame 10 and a bracket 15 attached to the body frame 10.

As shown in FIGS. 1 and 6 through 8, the gate frame 7 is formed of frame plates 71 attached to and surrounding a rectangular vertical plate 70. A passage opening 72 is formed in the vertical plate 70. The upper frame plate 71 rotatably supports a horizontal support shaft 51 extending transversely, and a main container body 50 of the grass catcher 5 is supported by support shaft 51. Thus, the grass catcher 5 is pivotable between a grass collecting position in which an opening 50a of the main container body 50 is opposed to the vertical plate 70 to align with the passage opening 72 of the vertical plate 70, and a grass discharge position in which the opening 50a is opposed to the ground. The horizontal support shaft 51 has a drive arm 52 attached thereto. The gate frame 7 has, attached thereto, a hydraulic cylinder 53 acting as a discharge actuator for swinging the drive arm 52. By the driving force of this hydraulic cylinder 53, the grass catcher 5 is swung between the grass collecting position and grass discharge position. The swing system for swinging the grass catcher 5 with the driving force of the hydraulic cylinder 53 constitutes a swing mechanism.

In this embodiment, the gate frame 7 is supported in a rear position of the vehicle body 1 to be vertically movable through a lift link mechanism 8. The lift link mechanism 8 includes upper arms 80 and lower arms 81 extending parallel to each other from right and left upper ends of a rollover protection frame 16 erected on the vehicle body 1 to lower positions on the gate frame 7, to form parallelogram links, and a hydraulic cylinder 82 acting as a lift actuator extending between the rollover protection frame 16 and a lower arm 81. The hydraulic cylinder 82 is operable to move vertically the grass catcher 5 pivotably supported by the gate frame 7, between a working level corresponding to the height of the outlet portion 6B of the grass collecting duct 6, and a grass discharge level higher than the loading platform of a truck. The lift link mechanism 8 and the hydraulic cylinder 82 constitute a lift mechanism.

At the working level, the outlet portion 6B of the grass collecting duct 6 and the opening 50a of the main container body 50 are substantially opposed to each other. The vertical plate 70 of the gate frame 7 is located in a boundary plane between the outlet portion 6B and opening 50a. The grass clippings transmitted from the grass collecting duct 6 may be delivered to the grass catcher 5 through the passage opening 72 of the vertical plate 70.

When the grass catcher 5 is set to the working level as shown in FIG. 1, the rocking ends of the upper arms 80 and lower arms 81 forming the lift link mechanism 8 are directed obliquely downward. When the grass catcher 5 is raised with the gate frame 7, the gate frame 7 is displaced by a swing of the upper arms 80 and lower arms 81, so that the gate frame 7 is raised while being displaced rearward from the outlet portion 6B of the grass collecting duct 6.

The bottom plate unit 63 acting as a bottom wall in the outlet portion 6B of the grass collecting duct 6 includes a main body 63a supported by the gate frame 7, and a movable part 63b pivotably supported at a forward end (i.e. an upstream end in the direction of transport of grass clippings) of the main body 63a. The bottom plate unit 63 is constructed such that, when raising the grass catcher 5, the movable part 63b is swung down to prevent the movable part 63b from contacting the top plate 60. When the grass catcher 5 is swung from the grass collecting position to the grass discharge position, the main body 63a is swung to have its surface largely inclined relative to the ground to discharge grass clippings deposited on the upper surface. The construction of this bottom plate unit 63 will be described below.

Figure 6:
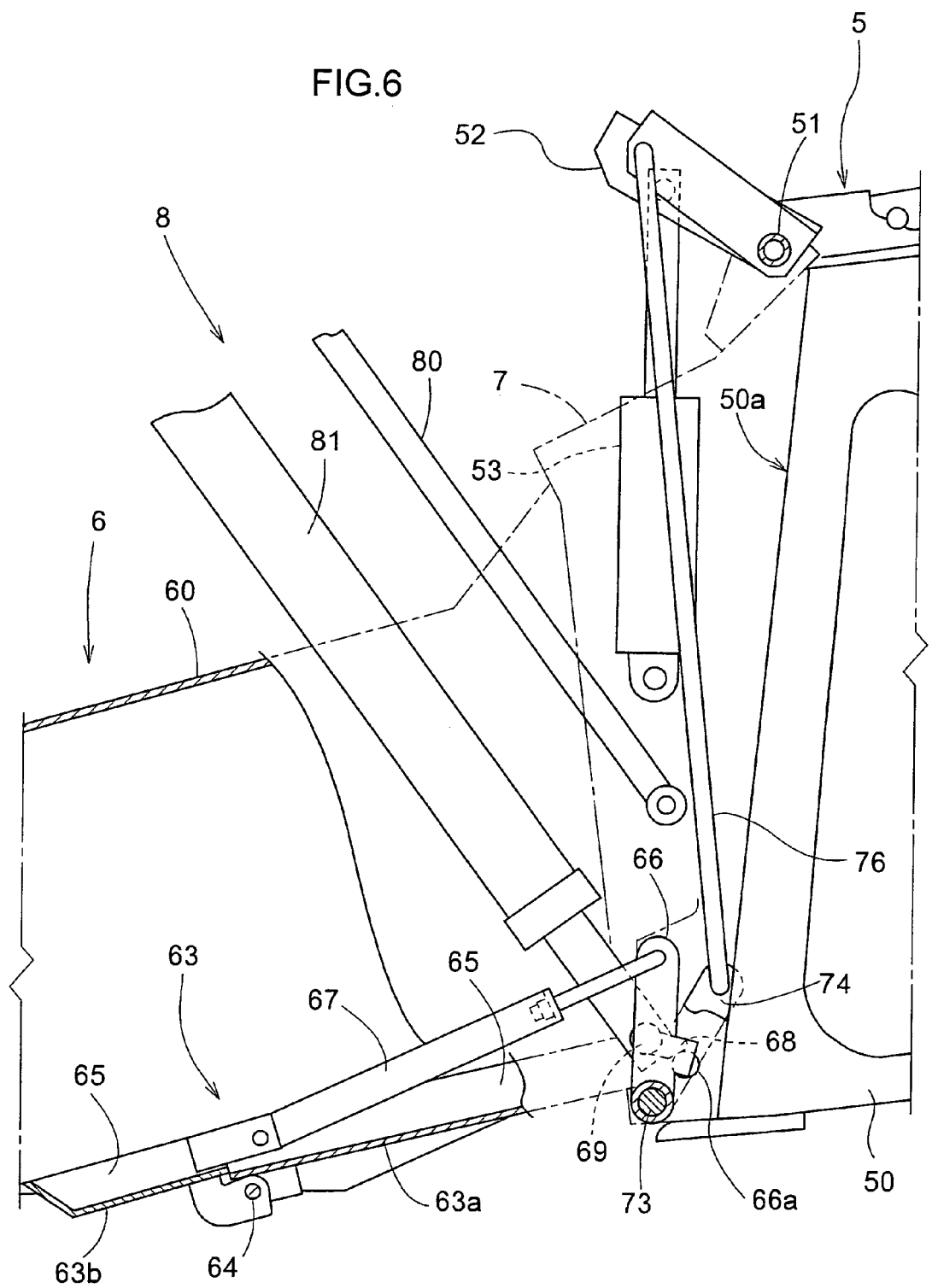
FIG. 6 is a sectional view showing a support structure for a bottom plate unit in the first embodiment.
Figure 7:
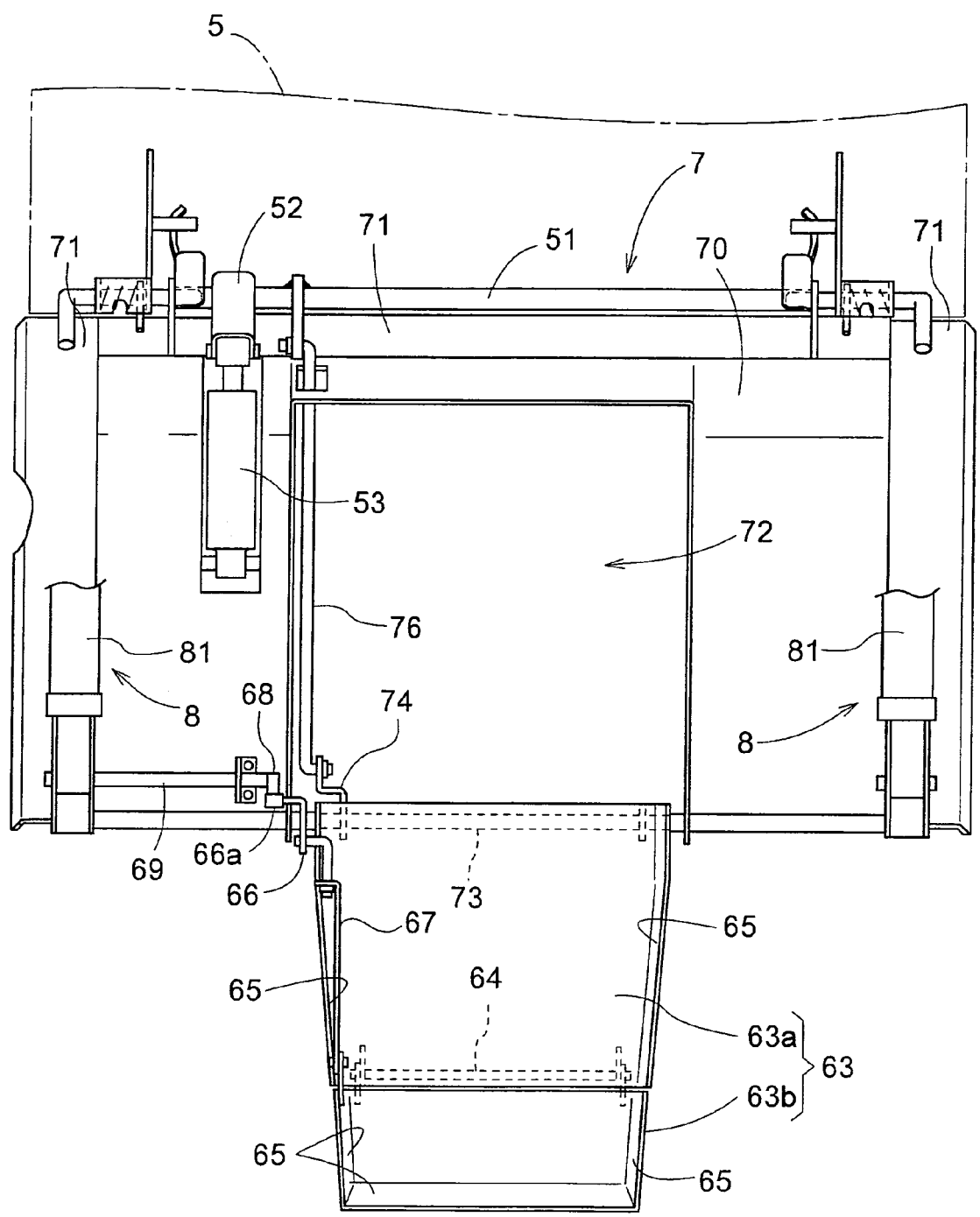
FIG. 7 is a front view showing a rearward bottom plate and a gate frame in the first embodiment.

As shown in FIGS. 5 through 7, the main body 63a is supported by a lower portion of the gate frame 7 to be pivotable through a transverse pivot shaft 73 disposed on a transverse axis. The movable part 63b is supported at the forward end side of the main body 63a to be pivotable about a support shaft 64 disposed on a transverse axis. The main body 63a has webs 65 arranged at opposite ends thereof to prevent the grass clippings deposited on the surface of the bottom plate unit 63 from inadvertently falling from the sides. The bottom plate unit 63 with these webs 65 has a channel structure with an upward opening. The bottom plate unit 63 is laid out, in its horizontal posture, to fit into the channel structure with the downward opening of the outlet portion 6B of the grass collecting duct 6.

The rocking end of a swing arm 74 fixed to the transverse pivot shaft 73 and the rocking end of the drive arm 52 are interlocked by a rod 76 acting as a linkage member. An intermediate swing arm 66 (an example of swing piece) supported to be pivotable about the axis of the transverse pivot shaft 73 and the movable part 63b are interlocked by a linkage member 67. A control shaft 69 connected to a lower end of the lower arm 81 has a cam 68 for contacting a contact member 66a formed integrally with the intermediate swing arm 66. The rod 76 interconnecting the drive arm 52 and swing arm 74 forms an interlocking mechanism.

Figure 8:
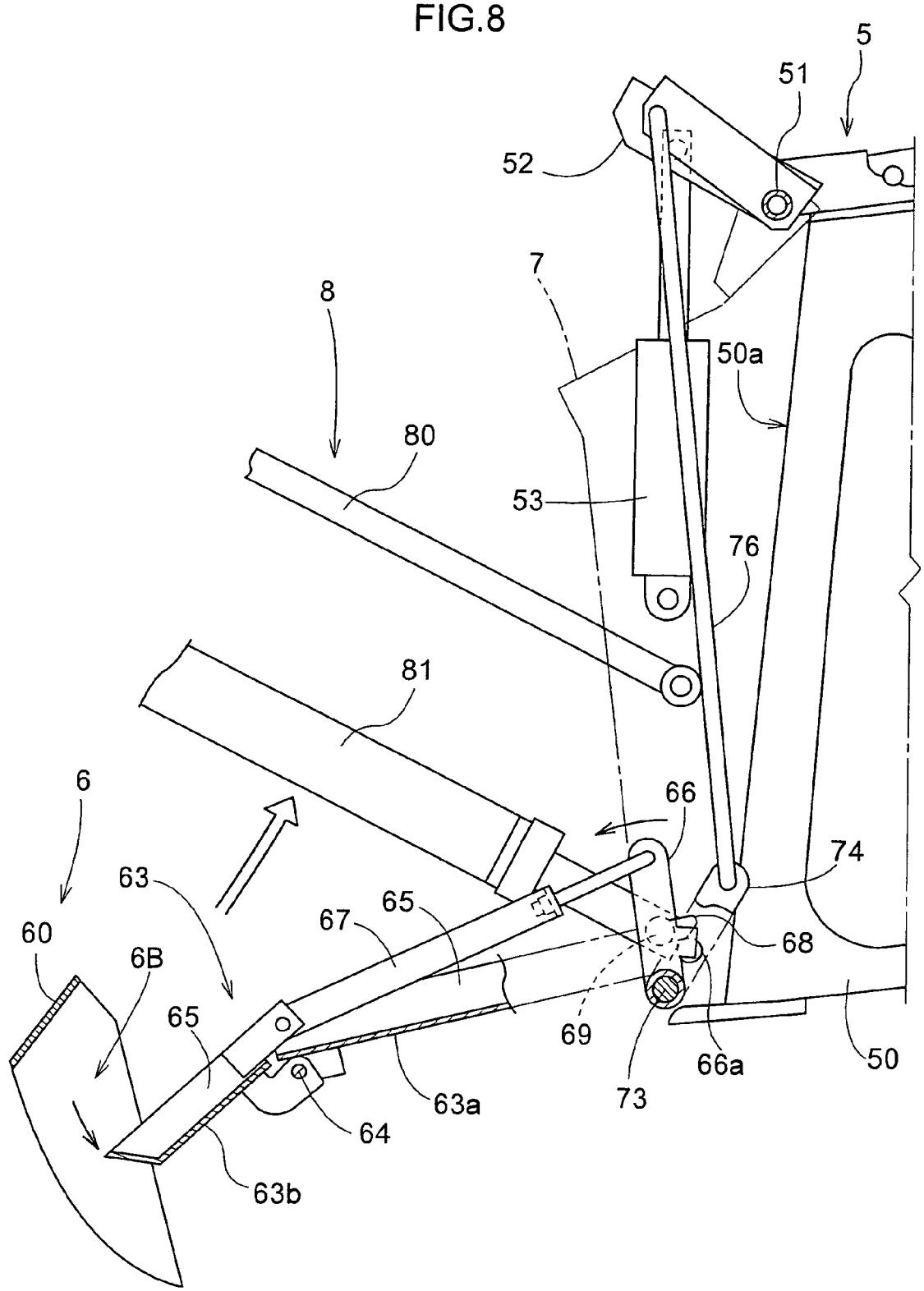
FIG. 8 is a side view showing the operation form of the sole plate unit at the time of the rise of the gate frame of the first embodiment.

With the above construction, when the grass catcher 5 along with the gate frame 7 begins to be raised in order to discharge the grass clippings accumulated in the grass catcher 5, as shown in FIG. 8, a change in the swing position of the lower arm 81 swings the control shaft 69 connected to the lower end of the lower arm 81. With this swinging movement, the cam 68 swings away from the contact member 66a. As a result, a swing of the intermediate swing arm 66 is allowed, whereby the forward end of the movable part 63b swings downward about the support shaft 64 by gravity. In the first embodiment, the intermediate swing arm 66, linkage member 67, control shaft 69, cam 68 and contact member 66a constitute a shortening mechanism.

That is, when raising the grass catcher 5 with the gate frame 7, the main body 63a of the bottom plate unit 63 maintains a substantially horizontal posture to hold the grass clippings falling from the passage opening 72 of the gate frame 7. The characteristic of the lift link mechanism 8 is such that the gate frame 7 is displaced rearward away from the rear end of the grass collecting duct 6. Where the bottom plate unit 63 is constructed to project to a large extent forward, the forward end of the bottom plate unit 63 could contact the top plate 60 forming the grass collecting duct 6. To avoid this contact, as noted above, the movable part 63b is constructed pivotable so as to bend downward as linked with the ascent of the gate frame 7. Thus, when the gate frame 7 is raised, the forward end of the bottom plate unit 63 is kept clear of the top plate 60, to realize a smooth raising operation.

Figure 9:
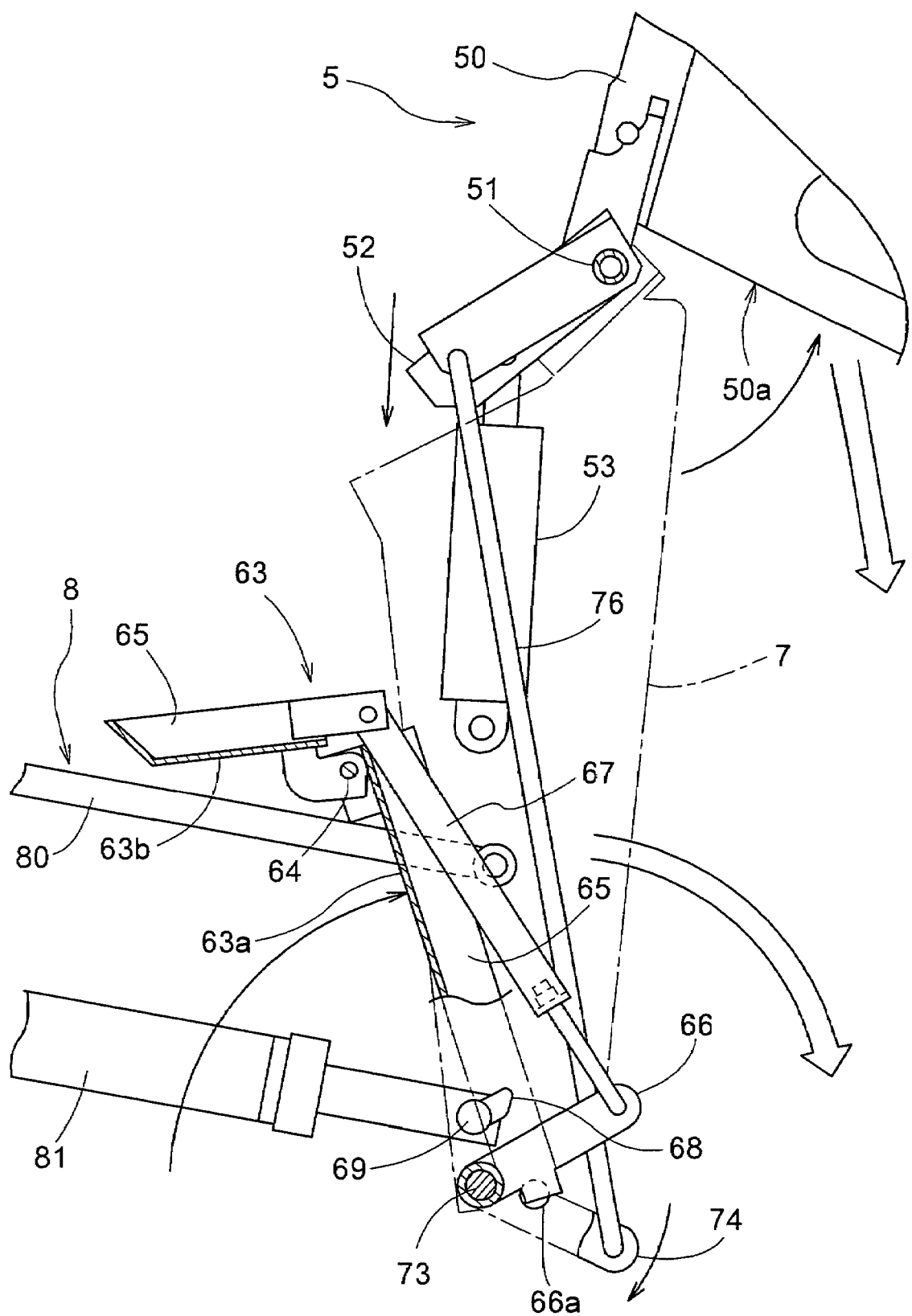
FIG. 9 is a side view showing a position of the bottom plate unit when a grass catcher in the first embodiment is set to a grass discharge position.

When discharging the grass clippings accumulated in the grass catcher 5 after raising the grass catcher 5 with the gate frame 7, as shown in FIG. 9, the hydraulic cylinder 53 is operated to swing the drive arm 52 counterclockwise (in FIG. 9) to set the grass catcher 5 to the grass discharge position. In time of swinging the grass catcher 5, the swinging force of the drive arm 52 pushes down the connecting rod 76 to swing the swing arm 74 clockwise (in FIG. 9). As a result, the bottom plate unit 63 supported by the transverse pivot shaft 73 connected to the swing arm 74 is swung to upstanding posture. Thus, the bottom plate unit 63 is set to the upstanding posture as mechanically interlocked to the operation for setting the grass catcher 5 to the grass discharge position. In time of high dumping for discharging grass clippings from the grass catcher 5 to the loading platform of a truck, the grass clippings accumulated in the grass catcher 5 and the grass clippings deposited on the bottom plate unit 63 can be discharged at the same time.

Thus, according to this invention, in time of a grass cutting operation, grass clippings are transmitted from the mower unit 4 to the grass collecting duct 6. In the rear end region (downstream in the direction of transport of the grass clippings) of the grass collecting duct 6, the air currents are controlled steadily by the bottom plate unit 63 formed over a sufficiently long distance along the direction of transport of the grass clippings. The grass clippings transmitted with these air currents are delivered through the gate frame 7 into the grass catcher 5. While the bottom plate unit 63 is formed over a sufficiently long distance, contact between the forward end of the bottom plate unit 63 and the top plate 60 of the grass collecting duct 6 is avoided since the movable part 63b at the forward end of the bottom plate unit 63 is made to swing so as to bend downward. This realizes a smooth vertical movement without causing breakage and malfunctioning. Since the main body 63a of the bottom plate unit 63 is maintained in horizontal posture, the main body 63a will catch any grass clippings falling from the passage opening 72 of the gate frame 7, whereby no grass clippings will scatter to the ground. In the first embodiment, in particular, as interlocked to an ascent of the gate frame 7, the movable part 63b is made to swing so as to bend downward by gravity relative to the main body 63a of the bottom plate unit 63. There is no need to provide an actuator for exclusive use in causing this swing. Moreover, the bottom plate unit 63 (main body 63a) is swung toward the upstanding posture as interlocked to the swing to the grass discharge position of the grass catcher 5. There is no need to provide an actuator for exclusive use in causing this swing, either. These features are effective to avoid an increase in the number of component and complication of the structure.

In the first embodiment, a spring may be provided to cause the movable part 63b of the bottom plate unit 63 to swing downward. The upstanding posture taken by the main body 63a of the bottom plate unit 63 does not necessarily mean a vertical posture, but means a steep sloping posture for allowing grass clippings to fall by gravity.

Second Embodiment

Figure 10A:
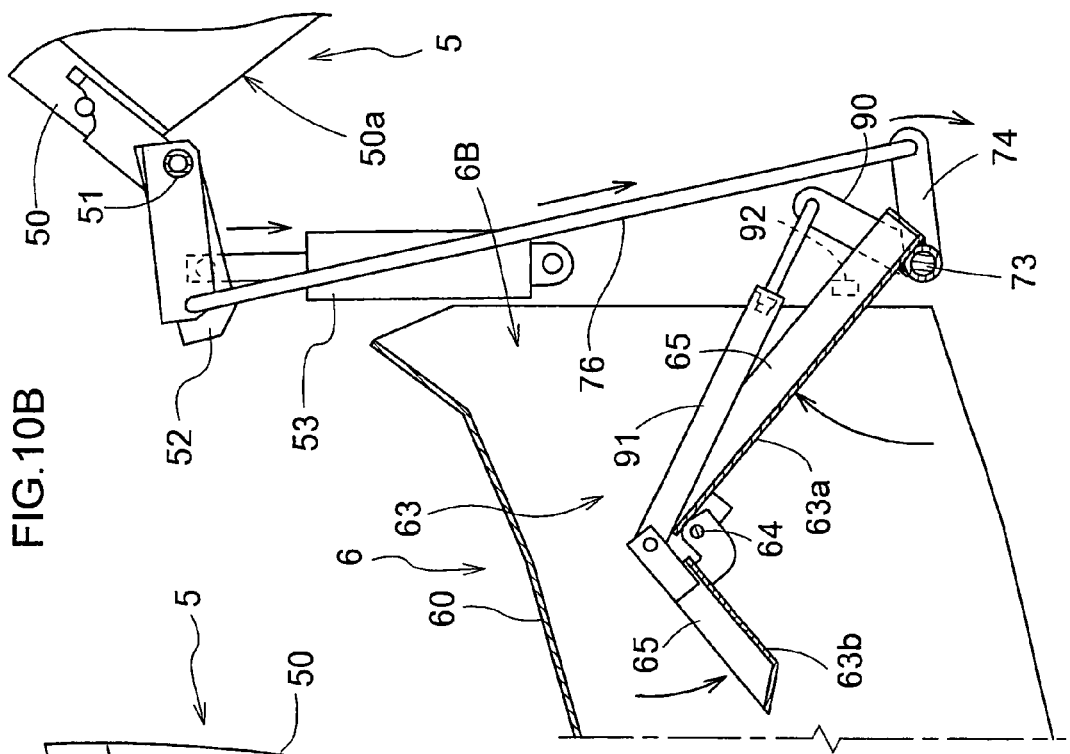
FIG. 10A is a side view of a grass catcher before being set to a grass discharge position in a second embodiment.
Figure 10B:
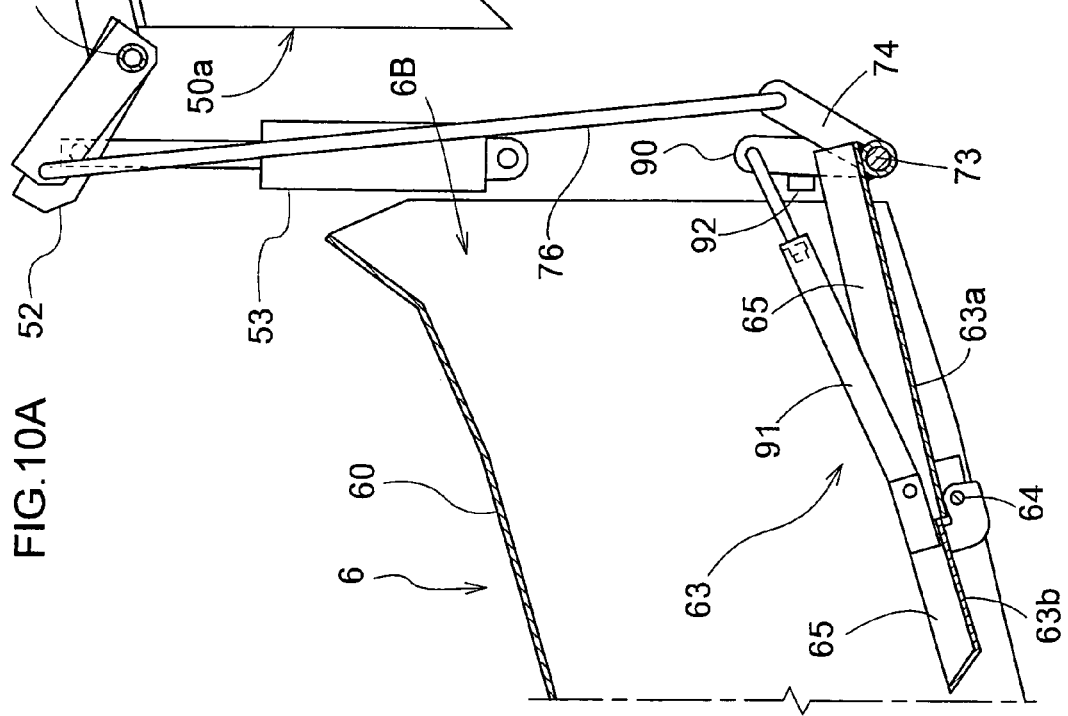
FIG. 10B is a side view of the grass catcher set to the grass discharge position in the second embodiment.

In the second embodiment, as shown in FIGS. 10A and 10B, when discharging grass clippings from the grass catcher 5, the grass catcher 5 is not raised but is swung in the grass collecting level from the grass collecting position to the grass discharge position. A shortening mechanism is provided for reducing the amount of projection of the bottom plate unit 63 to avoid contact with the top plate 60 forming the grass collecting duct 6 when the bottom plate unit 63 swings to the upstanding posture as interlocked to the swing of the grass catcher 5 from the grass collecting position to the grass discharge position. (In the second embodiment, like numerals or references are used to identify like components which are the same as in the first embodiment.)

The main body 63a of the bottom plate unit 63 is supported by a lower portion of the gate frame 7 to be pivotable through a transverse pivot shaft 73 disposed on a transverse axis. The movable part 63b is supported at the forward end side of the main body 63a to be pivotable about a support shaft 64 disposed on a transverse axis. The main body 63a has webs 65 arranged at opposite ends thereof to prevent the grass clippings deposited on the surface of the bottom plate unit 63 from inadvertently falling from the sides. The bottom plate unit 63 with these webs 65 has a channel structure with an upward opening. The bottom plate unit 63 is laid out, in its horizontal posture, to fit into the channel structure with the downward opening of the outlet portion 6B of the grass collecting duct 6.

As seen from FIGS. 10A and 10B, the rocking end of a swing arm 74 fixed to the transverse pivot shaft 73 and the rocking end of the drive arm 52 are interlocked by a rod 76 acting as a linkage member. An intermediate arm 90 supported to be pivotable about the axis of the transverse pivot shaft 73 and the movable part 63b are interlocked by a linkage member 91. The gate frame 7 has a stopper 92 formed thereon for contacting the intermediate arm 90 to restrict the swing of the movable part 63b. The stopper 92 is disposed in a position for stopping the swing of the movable part 63b in the direction to move the forward end downward by gravity. The intermediate arm 90 is freely pivotably connected at the end not contacting the stopper 92, to the transverse pivot shaft 73.

With the above construction, when the grass catcher 5 is swung from the grass collecting position to the grass discharge position by the driving force of the hydraulic cylinder 53, the swinging force of the drive arm 52 pushes down the connecting rod 76 to swing the swing arm 74. As a result, the bottom plate unit 63 supported by the transverse pivot shaft 73 connected to the swing arm 74 is swung to upstanding posture. When the bottom plate unit 63 is swung as noted above, the swing of the intermediate arm 90 is restricted by the stopper 92. However, since the distance of the intermediate arm 90 and movable part 63b is shortened, the movable part 63b swings down by gravity.

In the second embodiment, the shortening mechanism includes the intermediate arm 90, connecting member 91 and stopper 92. When the bottom plate unit 63 is swung to the upstanding posture, the shortening mechanism makes the movable part 63b swing so as to bend downward by gravity, thereby reducing the amount of projection of the bottom plate unit 63. This realizes a swing to the upstanding posture of the bottom plate unit 63 while avoiding contact with the top plate 60 of the grass collecting duct 6.

Third Embodiment

In the third embodiment, as shown in FIGS. 11A and 11B, when discharging grass clippings from the grass catcher 5, the grass catcher 5 is not raised but is swung in the grass collecting level from the grass collecting position to the grass discharge position. A shortening mechanism is provided for reducing the amount of projection of the bottom plate unit 63 to avoid contact with the top plate 60 forming the grass collecting duct 6 when the bottom plate unit 63 swings to the upstanding posture as interlocked to the swing of the grass catcher 5 from the grass collecting position to the grass discharge position. (In the third embodiment, like numerals or references are used to identify like components which are the same as in the first embodiment.)

The main body 63a of the bottom plate unit 63 is supported by a lower portion of the gate frame 7 to be pivotable through a transverse pivot shaft 73 disposed on a transverse axis. The movable part 63b is supported at the forward end side of the main body 63a through a support 99 to be slidable toward and away from the gate frame 7. The main body 63a has webs 65 arranged at opposite ends thereof to prevent the grass clippings deposited on the surface of the bottom plate unit 63 from inadvertently falling from the sides. The bottom plate unit 63 with these webs 65 has a channel structure with an upward opening. The bottom plate unit 63 is laid out, in its horizontal posture, to fit into the channel structure with the downward opening of the outlet portion 6B of the grass collecting duct 6. The support 99 has a plurality of pins 99a supported by the main body 65a and inserted in a slot 99b formed in a member attached to the movable part 63b. The support 99 has a function for allowing the main body 65a and movable part 63b to slide linearly relative to each other. However, the support 99 is not limited to the structure shown in the drawings. The may have a construction having rollers guided by guide rails, or a construction for supporting the movable part 65b to be movable relative to the main body 65a through a pantograph type link mechanism.

As seen from FIGS. 11A and 11B, a crank arm 97 acting as a control arm is supported to be pivotable about a support shaft 96 extending parallel to the transverse pivot shaft 73, relative to a swing member 95 pivotable with the transverse pivot shaft 73. One end of the crank arm 97 is connected to the rocking end of the drive arm 52 through a rod 76 acting as an interlocking mechanism. A connecting end 76a of the rod 76 is inserted in a slot 95a formed in the swing member 95. The other end of the crank arm 97 is connected to the movable part 63b through a connecting member 98.

With the above construction, when the grass catcher 5 is swung from the grass collecting position to the grass discharge position by the driving force of the hydraulic cylinder 53, the swinging force of the drive arm 52 pushes down the connecting rod 76 to swing the crank arm 97 clockwise as in FIG. 11B. The force of this swing causes, through the connecting member 98, the movable part 63b to slide toward the gate frame 7, thereby reducing the amount of projection of the forward end of the bottom plate unit 63. Then, the connection end 76a of the rod 76 contacts the lower end of the slot 95a, thereby to swing the swing member 95 and main body 63a together.

In the third embodiment, the shortening mechanism includes the crank arm 97 and connecting member 98. When the bottom plate unit 63 is swung to the upstanding posture, the shortening mechanism slides the movable part 63b before the bottom plate unit 63 begins to swing, thereby to reduce the amount of projection of the bottom plate unit 63. Since the amount of projection of the bottom plate unit 63 is reduced before the swing is started, the swing to the upstanding posture of the bottom plate unit 63 is realized while reliably avoiding contact with the top plate 60 of the grass collecting duct 6.

Fourth Embodimnt

In the fourth embodiment, as shown in FIGS. 12A and 12B, when discharging grass clippings from the grass catcher 5, the grass catcher 5 is not raised but is swung in the grass collecting level from the grass collecting position to the grass discharge position. A shortening mechanism is provided for reducing the amount of projection of the bottom plate unit 63 to avoid contact with the top plate 60 forming the grass collecting duct 6 when the bottom plate unit 63 swings to the upstanding posture as interlocked to the swing of the grass catcher 5 from the grass collecting position to the grass discharge position. (In the fourth embodiment, like numerals or references are used to identify like components which are the same as in the first embodiment.)

The main body 63a of the bottom plate unit 63 is supported by a lower portion of the gate frame 7 to be pivotable through a transverse pivot shaft 73 disposed on a transverse axis. The movable part 63b is supported at the forward end side of the main body 63a to be pivotable about a support shaft 64 disposed on a transverse axis. The main body 63a has webs 65 arranged at opposite ends thereof to prevent the grass clippings deposited on the surface of the bottom plate unit 63 from inadvertently falling from the sides. The bottom plate unit 63 with these webs 65 has a channel structure with an upward opening. The bottom plate unit 63 is laid out, in its horizontal posture, to fit into the channel structure with the downward opening of the outlet portion 6B of the grass collecting duct 6.

As seen from FIGS. 12A and 12B, a crank arm 97 is supported to be pivotable about a support shaft 96 extending parallel to the transverse pivot shaft 73, relative to a swing member 95 pivotable with the transverse pivot shaft 73. One end of the crank arm 97 is connected to the rocking end of the drive arm 52 through a rod 76 acting as an interlocking mechanism. A connecting end 76a of the rod 76 is inserted in a slot 95a formed in the swing member 95. The other end of the crank arm 97 is connected to the movable part 63b through a connecting member 98.

With the above construction, when the grass catcher 5 is swung from the grass collecting position to the grass discharge position by the driving force of the hydraulic cylinder 53, the swinging force of the drive arm 52 pushes down the connecting rod 76 to swing the crank arm 97 clockwise as shown in FIG. 12B. The force of this swing causes, through the connecting member 98, the movable part 63b to swing upward, thereby reducing the amount of projection of the forward end of the bottom plate unit 63. Then, the connection end 76a of the rod 76 contacts the lower end of the slot 95a, thereby to swing the swing member 95 and main body 63a together.

In the fourth embodiment, the shortening mechanism includes the crank arm 97 and connecting member 98. When the bottom plate unit 63 is swung to the upstanding posture, the shortening mechanism swings the movable part 63b before the bottom plate unit 63 begins to swing, thereby to reduce the amount of projection of the bottom plate unit 63. Since the amount of projection of the bottom plate unit 63 is reduced before the swing is started, the swing to the upstanding posture of the bottom plate unit 63 is realized while reliably avoiding contact with the top plate 60 of the grass collecting duct 6.

Other Embodiments

This invention may be constructed as follows besides the foregoing embodiment:

(1) As a construction for reducing the amount of projection of the forward end of the bottom plate unit 63 in time of ascent of the gate frame 7, the construction in the first embodiment may be replaced by a construction for swinging the movable part 63b upward relative to the main body 63a, or a construction for sliding the movable part 63b toward the main body 63a.

(2) As a construction for reducing the amount of projection of the forward end of the bottom plate unit 63 by displacing the movable part 63b relative to the main body 63a, the mechanical interlocking structures as in the first to fourth embodiments may be replaced with an electric motor or hydraulic actuator for exclusive use in displacing the movable part 63b relative to the main body 63a.

(3) As a construction for swinging the bottom plate unit 63 (main body 63a) relative to the gate frame 7, the mechanical interlocking structures as in the first to fourth embodiments may be replaced with an electric motor or hydraulic actuator for exclusive use in swinging the bottom plate unit 63 (main body 63a).

(4) FIGS. 13A and 3B show a further embodiment of the bottom plate unit 63. Here, the swing arm 74 connected to the rod 76 is fixed to the transverse pivot shaft 73, and the rear end of the movable part 63b of the bottom plate unit 63 is fixed to the transverse pivot shaft 73. Thus, with a downward displacement of the rod 76, the movable part 63b is swingable upward about the transverse pivot shaft 73. The main body 63a of the bottom plate unit 63 is pivotally attached at the rear end thereof to a different transverse pivot shaft 73a. The main body 63a has a length having the forward end thereof located over an upper surface at the rear end of the movable part 63b. The main body 63a is biased by a spring 73b to swing about the swing transverse pivot shaft 73a, and press upon the upper surface at the rear end of the movable part 63b. In the grass collecting position shown in FIG. 13A, the movable part 63b and main body 63a presents a substantially horizontal plane. When the grass catcher 5 is swung from the grass collecting position to the grass discharge position, the swinging force of the drive arm 52 pushes down the connecting rod 76 to swing the movable part 63b upward. With the upward swing of the movable part 63b, the main body 63a swing upward against the biasing force of the spring 73b. In this modified embodiment, the main body 63a and movable part 63b are swingable about the different transverse pivot shafts. Thus, the loci of their swings may be set properly (to be small).

What is claimed is:

1. A grass collecting system having a grass collecting duct for transmitting grass clippings reaped by a mower unit to a grass catcher in a grass collecting position, said grass catcher being swingable to a grass discharge position, wherein said grass collecting duct includes a top plate and right and left side plates for guiding the grass clippings from the mower unit to the grass catcher, an outlet portion being defined by an end of a space surrounded by the top plate and the right and left side plates, said grass collecting system comprising:
   a grass clippings discharge path for transmitting the grass clippings received from said mower unit, from the outlet portion of said grass collecting duct into said grass catcher;
   a bottom plate unit locatable in said outlet portion to be swingable about a pivot shaft from a first position corresponding to a guide position for preventing falling of the grass clippings to a second position corresponding to an upstanding position, the bottom plate unit having flat plate portions that cover at least a part of a downward opening defined in the grass collecting duct when the bottom plate unit is in the first position, the pivot shaft being supported to a part associated with the grass catcher; and
   wherein said bottom plate unit has a shortening mechanism for shortening a distance between a forward end of said bottom plate unit projecting into said grass collecting duct and said pivot shaft, said distance measured along a straight line extending between the forward end of said bottom plate unit and said pivot shaft.

2. A grass collecting system as defined in claim 1, wherein said shortening mechanism is operable when said grass catcher is displaced from said grass collecting position.

3. A grass collecting system as defined in claim 2, further comprising a gate frame disposed between the outlet portion of said grass collecting duct and said grass catcher for pivotably supporting said grass catcher, and a lift mechanism for supporting said gate frame and said grass catcher to be vertically movable relative to the outlet portion of said grass collecting duct.

4. A grass collecting system as defined in claim 1, wherein said shortening mechanism is a folding mechanism for folding two of said flat plate portions.

5. A grass collecting system as defined in claim 4, wherein said folding mechanism is operable to fold the two flat plate portions in a valley fold.

6. A grass collecting system as defined in claim 4, wherein said folding mechanism is operable to fold the two flat plate portions in a mountain fold.

7. A grass collecting system as defined in claim 1, wherein said grass collecting duct includes a bottom plate disposed in at least a portion of the duct.

8. A grass collecting system as defined in claim 1, wherein when the bottom plate unit is in the first position, said distance is greater than the height of the outlet portion of the grass collecting duct, wherein the shortening mechanism shortens said distance such that said distance with the bottom plate unit in the second position is less than said distance with the bottom plate unit in the first position thereby preventing a collision of the forward end of the bottom plate unit against the top plate of the grass collecting duct.

9. A grass collecting system as defined in claim 1, wherein the part associated with the grass collector is a gate frame disposed forwardly of the grass catcher for pivotably supporting said grass catcher.

10. A grass collecting system, having a grass collecting duct for transmitting grass clippings reaped by a mower unit to a grass catcher in a grass collecting position, said grass catcher being swingable to a grass discharge position, wherein said grass collecting duct includes a top plate and right and left side plates for guiding the grass clippings from the mower unit to the grass catcher, an outlet portion being defined by an end of a space surrounded by the top plate and the right and left side plates, said grass collecting system comprising:
   a grass clippings discharge path for transmitting the grass clippings received from said mower unit, from the outlet portion of said grass collecting duct into said grass catcher;
   a bottom plate unit locatable in said outlet portion to be swingable about a pivot shaft from a guide position for preventing falling of the grass clippings to an upstanding position; and
   a shortening mechanism provided for said bottom plate unit for shortening a distance between a forward end of said bottom plate unit projecting into said grass collecting duct, and said pivot shaft, said distance measured along a straight line extending between the forward end of said bottom plate unit and said pivot shaft;
   a lift mechanism for supporting said grass catcher to be vertically movable relative to the outlet portion of said grass collecting duct, wherein said lift mechanism is a lift link mechanism for vertically moving said grass catcher by swinging said grass catcher with a driving force of a lift actuator;
   said bottom plate unit includes a main body supported to a part associated with the grass catcher, and a movable part supported to be pivotable about a transverse axis relative to the main body; and
   wherein the shortening mechanism causes said movable part to pivot in a predetermined direction with a change in position of said lift link mechanism when said grass catcher is raised from a grass collecting level by a pivoting movement of the lift link mechanism.

11. A grass collecting system as defined in claim 10, wherein each of the main body and the movable part of the bottom plate unit has a flat plate portion, and wherein said shortening mechanism is a folding mechanism for folding the two flat plate portions.

12. A grass collecting system as defined in claim 11, wherein said folding mechanism is operable to fold the two flat plate portions in a valley fold.

13. A grass collecting system as defined in claim 11, wherein said folding mechanism is operable to fold the two flat plate portions in a mountain fold.

14. A grass collecting system having a grass collecting duct for transmitting grass clippings reaped by a mower unit to a grass catcher in a grass collecting position, said grass catcher being swingable to a grass discharge position, wherein said grass collecting duct includes a top plate and right and left side plates for guiding the grass clippings from the mower unit to the grass catcher, an outlet portion being defined by an end of a space surrounded by the top plate and the right and left side plates, said grass collecting system comprising:
  a grass clippings discharge patch for transmitting the grass clippings received from said mower unit, from the outlet portion of said grass collecting duct into said grass catcher;
  a bottom plate unit locatable in said outlet portion to be swingable about a pivot shaft from a guide position for preventing falling of the grass clippings to an upstanding position; and
  a shortening mechanism provided for said bottom plate unit for shortening a distance between a forward end of said bottom plate unit projecting into said grass collecting duct, and said pivot shaft, said distance measured along a straight line extending between the forward end of said bottom plate unit and said pivot shaft;
  an interlocking mechanism for swinging said bottom plate unit to the upstanding position when said grass catcher switches from the grass collecting position to the grass discharge position, said shortening mechanism being operable in response to the swing to the upstanding position of said bottom plate unit by said interlocking mechanism.

15. A grass collecting system as defined in claim 14, further comprising a gate frame disposed between the outlet portion of said grass collecting duct and said grass catcher for pivotably supporting said grass catcher, and a swing mechanism for swinging said grass catcher between said grass collecting position in which an opening of said grass catcher is opposed to said gate frame, and said grass discharge position in which the opening is directed downward, said interlocking mechanism including a linkage member for transmitting, to said bottom plate unit, a force of the swing of said grass catcher from said grass collecting position to the grass discharge position, thereby to swing said bottom plate unit from said guide position to said upstanding position; wherein said bottom plate unit includes a main body supported to be pivotable about a transverse proximal end axis relative to said gate frame, and a movable part supported to be pivotable about a transverse distal end axis at a forward end of the main body, said shortening mechanism permitting a forward end of said movable part to swing downward by gravity in response to the swing of said bottom plate unit to the upstanding position.

16. A grass collecting system as defined in claim 15, wherein said shortening mechanism is operable to start folding said movable part before the swing of said bottom plate unit to the upstanding position.

17. A grass collecting system as defined in claim 15, wherein said swing mechanism includes a discharge actuator for applying a swing control force to a drive arm swingable with said grass catcher, and said linkage member includes a rod linking a swing arm swingable with said bottom plate unit and said drive arm.

18. A grass collecting system having a grass collecting duct for transmitting grass clippings reaped by a mower unit to a grass catcher in a grass collecting position, said grass catcher being swingable to a grass discharge position, wherein said grass collecting duct includes a top plate and right and left side plates for guiding the grass clippings from the mower unit to the grass catcher, an outlet portion being defined by an end of a space surrounded by the top plate and the right and left side plates, said grass collecting system comprising:
  a grass clippings discharge path for transmitting the grass clippings received from said mower unit, from the outlet portion of said grass collecting duct into said grass catcher;
  a bottom plate unit disposed in said outlet portion to be swingable about a pivot shaft from a guide position for preventing falling of the grass clippings to an upstanding position;
  a shortening mechanism provided for said bottom plate unit for shortening a distance between a forward end of said bottom plate unit projecting into said grass collecting duct, and said pivot shaft, wherein said shortening mechanism is operable when said grass catcher is displaced from said grass collecting position;
  a gate frame disposed between the outlet portion of said grass collecting duct and said grass catcher for pivotably supporting said grass catcher; and
  a lift mechanism for supporting said gate frame and said grass catcher to be vertically movable relative to the outlet portion of said grass collecting duct, wherein said lift mechanism is a lift link mechanism for vertically moving said gate frame by swinging said gate frame with a driving force of a lift actuator, said bottom plate unit includes a main body supported by said gate frame, and a movable part supported to be pivotable about a transverse axis relative to the main body and said shortening mechanism includes a cam swingable with a swing of said lift link mechanism, a swing piece set to a swing position by contact with the cam object, and a linkage member for interlocking said swing piece and said movable part, said cam allowing said swing piece to swing with a change in position of said lift link, and allows said movable part through said linkage member to swing in a predetermined direction when said gate frame is raised from a grass collecting level.

* * * * *